(12) United States Patent
Velius et al.

(10) Patent No.: US 9,171,548 B2
(45) Date of Patent: Oct. 27, 2015

(54) METHODS AND SYSTEMS FOR SPEAKER IDENTITY VERIFICATION

(75) Inventors: George A. Velius, St. Charles, MO (US); David A. Whelan, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 492 days.

(21) Appl. No.: 13/213,609

(22) Filed: Aug. 19, 2011

(65) Prior Publication Data
US 2013/0043977 A1 Feb. 21, 2013

(51) Int. Cl.
G06F 7/04 (2006.01)
G10L 17/02 (2013.01)
G10L 17/10 (2013.01)
G06K 9/00 (2006.01)

(52) U.S. Cl.
CPC .......... *G10L 17/02* (2013.01); *G10L 17/10* (2013.01); *G06K 9/00221* (2013.01); *G06K 9/00268* (2013.01); *G06K 9/00335* (2013.01); *G06K 9/00885* (2013.01)

(58) Field of Classification Search
USPC ........................................ 340/5.84
See application file for complete search history.

(56) References Cited

U.S. PATENT DOCUMENTS

| 6,006,175 | A  * | 12/1999 | Holzrichter ............... 704/208 |
| 6,272,466 | B1 * | 8/2001  | Harada et al. ............. 704/270 |
| 6,411,933 | B1 * | 6/2002  | Maes et al. ................ 704/273 |
| 7,016,833 | B2   | 3/2006  | Gable et al. |
| 7,602,947 | B1 * | 10/2009 | Lemelson et al. ......... 382/116 |
| 7,616,295 | B2   | 11/2009 | Yokoyama et al. |
| 2003/0195748 | A1 * | 10/2003 | Schalkwyk ................ 704/231 |
| 2004/0083100 | A1 * | 4/2004  | Burnett et al. ............. 704/233 |
| 2005/0060153 | A1   | 3/2005  | Gable et al. |
| 2007/0299341 | A1 * | 12/2007 | Wang et al. ............... 600/443 |
| 2008/0004861 | A1 * | 1/2008  | Holzrichter et al. .......... 704/2 |
| 2010/0131273 | A1   | 5/2010  | Aley-Raz et al. |
| 2011/0213664 | A1 * | 9/2011  | Osterhout et al. ...... 705/14.58 |
| 2011/0311144 | A1   | 12/2011 | Tardif |
| 2012/0053931 | A1 * | 3/2012  | Holzrichter .............. 704/200.1 |
| 2012/0300961 | A1 * | 11/2012 | Moeller .................... 381/122 |

OTHER PUBLICATIONS

Search Report of UK Application No. GB1214706.2; Dec. 10, 2012; 3 pages.
Chetty, G.; Detecting Liveness in Multimodal Biometric Security Systems; IJCSNS International Journal of Computer Science and Network Security; vol. 9, No. 10, Oct. 2009; pp. 16-22.
Chetty, G. et al.; Audio-Visual Multimodal Fusion for Biometric Person Authentication and Liveness Verification; Australian Computer Society, Inc.; vol. 57; 2009; pp. 1-8.
Eveno, N. et al.; Co-Inertia Analysis for "Liveness" Test in Audio-Visual Biometrics; Proceedings of the 4th International Symposium on Image and Signal processing and Analysis; 2005; pp. 257-261.

* cited by examiner

*Primary Examiner* — Naomi Small
(74) *Attorney, Agent, or Firm* — Armstrong Teasdale LLP

(57) ABSTRACT

A system for confirming that a subject is the source of spoken audio and the identity of the subject providing the spoken audio is described. The system includes at least one motion sensor operable to capture physical motion of at least one articulator that contributes to the production of speech, at least one acoustic signal sensor to receive acoustic signals, and a processing device comprising a memory and communicatively coupled to the at least one motion sensor and the at least one acoustic signal sensor. The processing device is programmed to correlate physical motion data with acoustical signal data to uniquely characterize the subject for purposes of verifying the subject is the source of the acoustical signal data and the identity of the subject.

20 Claims, 3 Drawing Sheets

METHODS AND SYSTEMS FOR SPEAKER IDENTITY VERIFICATION

BACKGROUND

The field of the disclosure relates generally to security systems that utilize voice recognition, and more specifically, to methods and systems for speaker identity verification.

Security is a major concern for many and draws significant investment from both military and commercial endeavors. Identity verification is a key capability for many aspects of security. Speech-based identity verification is one of the least objectionable biometrics. However, an open issue with this biometric, computerized Speaker Identity Verification (SIV) is the threat of replay attacks.

A speech signal is quite complex and every natural utterance is unique. By focusing on speaker-specific characteristics of the speech signal, individual speakers can be distinguished. In producing speech, the human body performs many complex and coordinated tasks. When the result of all these tasks is reduced to a one-dimensional audio signal, the result is easily captured and replayed with high fidelity.

Previous attempts to address the replay attack issue have focused on determining the liveness' of the source by referring to additional signal data, for example, a two dimensional video of the speaker's face. However, modern video capture and replay technology makes such liveness testing also susceptible to spoofing.

BRIEF DESCRIPTION

In one aspect, a system for confirming that a subject is the source of spoken audio and the identity of the subject providing the spoken audio is provided. The system includes at least one motion sensor operable to capture physical motion of at least one articulator that contributes to the production of speech, at least one acoustic signal sensor to receive acoustic signals, and a processing device comprising a memory and communicatively coupled to the at least one motion sensor and the at least one acoustic signal sensor. The processing device is programmed to correlate physical motion data with acoustical signal data to confirm that the subject is the source of the acoustical signal data for purposes of uniquely characterizing the subject and determining the identity of the subject.

In another aspect, a method for verifying that a subject is the source of spoken audio is provided. The method includes receiving physical vibration information and acoustic speech information for the spoken audio via a plurality of sensors, the information purportedly from the subject, correlating the physical vibration information with the acoustic speech information, analyzing the correlated information with stored physical vibration information and acoustic speech information associated with the subject, and determining whether the correlation is within a defined threshold for verifying that the subject is the source of spoken audio and identifying the subject.

In still another aspect, a security system is provided that includes a security device, at least one motion sensor operable to capture physical motion of at least one articulator that contributes to the production of speech, at least one acoustic signal sensor to receive acoustic signals, and a processing device having a memory. The processing device is communicatively coupled to the security device, the at least one motion sensor and the at least one acoustic signal sensor and is programmed to correlate physical motion data received from the at least one motion sensor with previously stored physical motion data and correlate acoustical signal data received from the at least one acoustic signal sensor with previously stored acoustical signal data to uniquely characterize the subject for purposes of verifying the subject is the source of the acoustical signal data and verifying the identity of the subject for providing access to the security device.

The features, functions, and advantages that have been discussed can be achieved independently in various embodiments or may be combined in yet other embodiments further details of which can be seen with reference to the following description and drawings.

DETAILED DESCRIPTION

Ultimately, to ensure that a speech signal is not artificially reproduced by an impostor, the physical source of the acoustic signal must be determined. The described embodiments thwart such replay attacks by confirming the presence of a functioning human vocal apparatus that produced the spoken utterances which then uniquely characterize the speaker. More specifically, modern remote sensing technology is used to monitor the human speech production system with sufficient precision to show conclusively that motion of human articulatory members is indeed the source of the acoustic speech signal used to verify an identity. As used herein, the human speech production system includes, but is not limited to, a plurality of vocal chords, cheeks, tongue, lips, trachea, etc.

As described above, the verification of an individual's claimed identity using their unique speech characteristics has been vulnerable to replay attacks. The described embodiments address such issues through measuring internal and external members of a speaker's vocal articulators and correlating physical motion with concurrently measured acoustic signals of the speaker's speech. Particularly, externally measurable vibrations, internal motion of the tongue/epiglottis/teeth/jaw, and/or internal/external vibration of vocal chords, cheek, jaw, lips, and trachea are all potential sources of data that might be correlated with an acoustic signal, as further described below.

In one embodiment, technical effects of the methods, systems, and computer-readable media described herein to confirm the identity of a source include at least one of: (a) sensor to capture physical vibration data, (b) an audio device to capture acoustic speech data, and (c) an analysis unit to correlate the vibration and speech data and determine whether the correlated data is within a defined threshold. Further technical effects include (d) simultaneously receiving physical vibration and acoustic speech information from an audio source, (e) correlating the information based upon potential delays in receiving the information from the sources, and (f) determining whether the correlated data is within a defined threshold.

Figure 1:
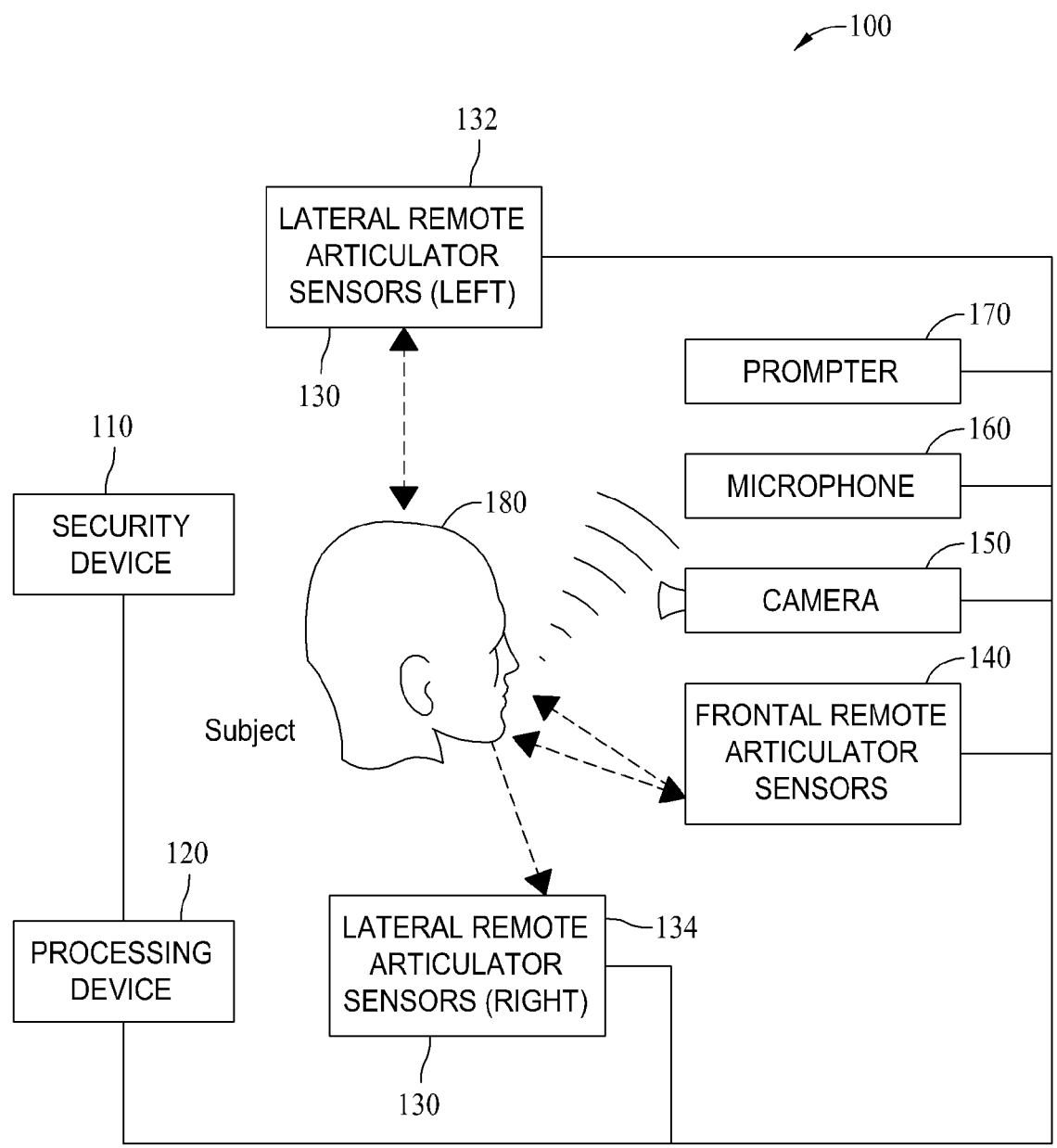
FIG. 1 is a block diagram of a system configured with sensors to establish a correlation between the motion of internal and external human articulators and a captured speech signal.

FIG. 1 is a block diagram of a computerized system 100 embodiment that uses remote sensing techniques to establish a sufficiently high correlation of the motion of both internal and external human articulators with a captured speech signal such that the physical source of the captured speech signal can be conclusively determined. In one embodiment, system 100 operates to confirm the identity claim of an individual and works in cooperation with an authentication system, such as security device 110, and do so in a manner resistant to both live and mechanical impersonation. In one example, security device 110 is an access control device, such as a door into a secure or classified work area. In another example, security device 110 is associated with an airport security terminal or other airport security device. Computerized system 100 shown in FIG. 1 is but one embodiment of a system that can be utilized to perform the processes described herein. Other system configurations may be utilized as well.

Computerized system 100 includes a processing system 120 which receives data from lateral remote articulator sensors 130 (left 132, right 134), frontal remote articulator sensors 140, a camera 150, and a microphone 160. A prompter 170 is controlled by processing system 120 and prompts the subject 180 with words or phrases to be spoken. The speaking of the words and/or phrases is captured by the sensors 130, 140, and one or more of camera 150 and microphone 160.

In one embodiment, sensors 130 and 140 include one or more micro-power pulse radars which are positioned to determine vocal chord closures and cheek oscillations. In short, the sensors 130, 140 combine to measure the actions of internal and external human articulators that contribute to the production of speech, for example, the vocal chords, tongue, lips, cheeks, and trachea. Each of these articulators vibrate or oscillate in some fashion during the production of speech, and such vibrations and oscillations can be captured and analyzed to ensure that the speech is not recorded and being generated by the subject 180. Correlation of the vibrations and oscillations allows for the modeling, by system 100, of physical positions of the articulators in time.

Figure 2:
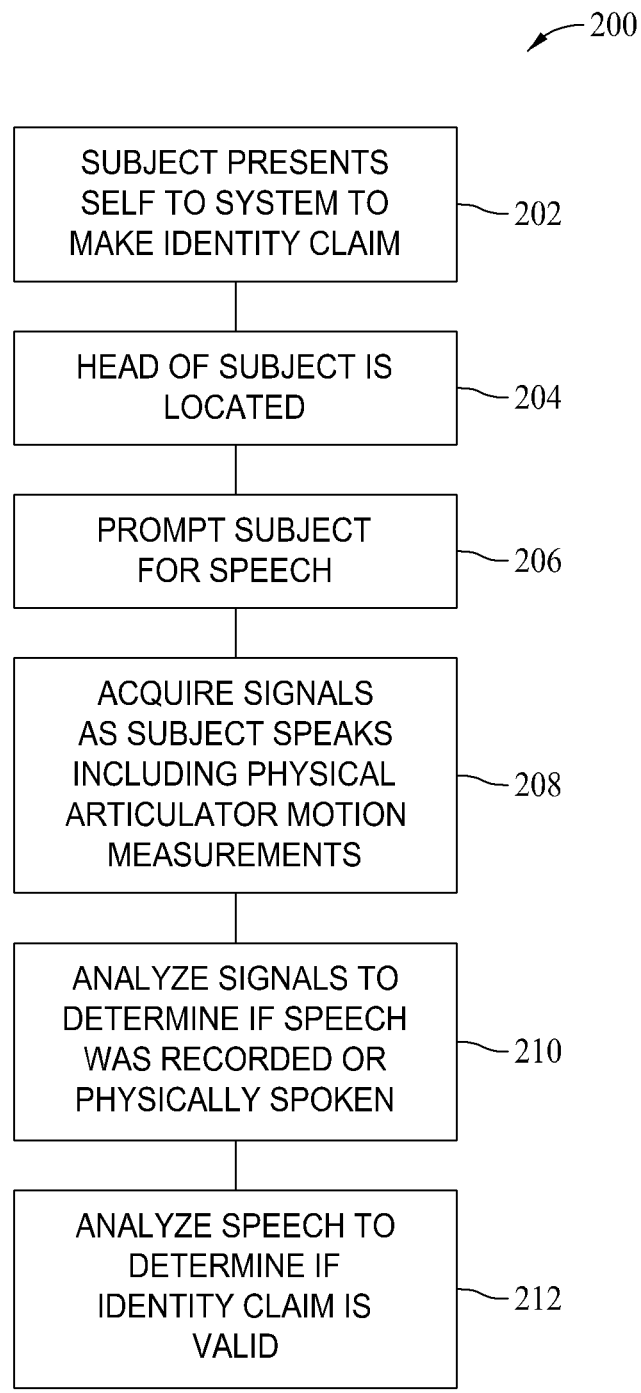
FIG. 2 is a flow chart illustrating a process for verifying the identity of a subject.

In one example, sensors 130 are laser devices that can capture movements of the cheeks and sensor 140 is a micro-power radar that captures movements of one or more of the tongue, lips, trachea and vocal chords. Processing device 120 ensures that captured vibrations and oscillations from the various sensors are in temporal alignment. To further illustrate, FIG. 2 is a flowchart 200 that illustrates one process that might be performed by the system 100 of FIG. 1. Initially, system 100 is presented 202 with an individual (i.e. subject 180) that wishes to make an identity claim. System 100 operates to locate 204 the head of the subject 180. In system 100 the head location function is performed, for example, by camera 150 along with processing device 120 to determine the position the head of the subject with respect to at least one motion sensor. In embodiments, camera 150 incorporates one or more of visual, infrared (IR), ultrasonic, or electromagnetic (EM) sensors. System 100, through operation of processing device 120 and prompter 170 prompts 206 subject 180 for speech. As the subject 180 speaks, system 100 acquires 208 signals including the subject's speech and physical articulator motion measurements, for example, cheek, throat, and vocal chord oscillations, and head, jaw, tongue, teeth, and lip position and movement. System 100 performs 210 an analysis to determine if the measured physical motions, potentially including oscillations, indicate, for example, a production mechanism for a recorded speech signal. If the performed 210 analysis indicates that an actual person is the source of the speech, a second analysis is performed 212 if the subject's identity claim is valid. System 100 operates as programmed based on the performed 210 analysis and the determination 212.

The described embodiments utilize dynamic models of internal and external articulatory members, as well as speech-induced oscillations of external members, as the basis for liveness testing. Further, the described embodiments suggest that external articulator motion, such as lip and jaw movements, can be mimicked by an impostor while an alternate audio source, such as a hidden mechanical speaker, replays audio recordings of the individual authorized to access the security device 110. However, system 100 by measuring physical dynamics of internal articulators associated with the subject as well as by measuring external oscillations of articulatory members, counteracts any fabricated system used in an impersonation attempt. Specifically, any fabricated system would have to approach the complexity of the human vocal mechanism including vocal chords, tongue, cheeks, jaw, and mouth, which is highly unlikely.

Computerized system 100 uses remote sensing techniques to establish such a high correlation of the motion of both internal and external human articulators with a captured speech signal that no spoofing and replay attacks will succeed. As stated above, an objective of the described embodiments is to confirm the identity claim of an individual cooperating with an authentication system (e.g., security device 110).

With synchronous capture of both acoustic and motion data, a degree of temporal alignment between motion events and their corresponding acoustic signal events can be computed. Thresholds or decision rules for accepting the articulator production mechanism as the source of the acoustic signal must be empirically determined. In various embodiments, a degree of temporal alignment of motion events may also be computed between captured data and previously captured data. For example, system 100 may be programmed to verify that vibrations and oscillations captured by at least one motion sensor are in temporal alignment with previously captured vibrations and oscillations stored in memory. In various embodiments, system 100 may be programmed to verify that speech information captured by an acoustic sensor is in temporal alignment with previously captured speech information stored in memory. In various embodiments, system 100 may verify both physical vibration information and acoustic speech information are in temporal alignment with previously stored physical vibration and acoustic speech information.

A number of techniques from different engineering disciplines are available as candidate solutions for measuring articulator motion. For example, for cheek oscillations, a micro-powered pulse radar is plausible. For head, jaw, and lip motion data, a real-time 3D camera 150 using light-phase and volumetric imaging techniques is used. For internal tissue motion of the tongue, glottis, and epiglottis, either radiofrequency-induced thermoacoustic tomography or low-power x-ray diffraction are used.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 3:
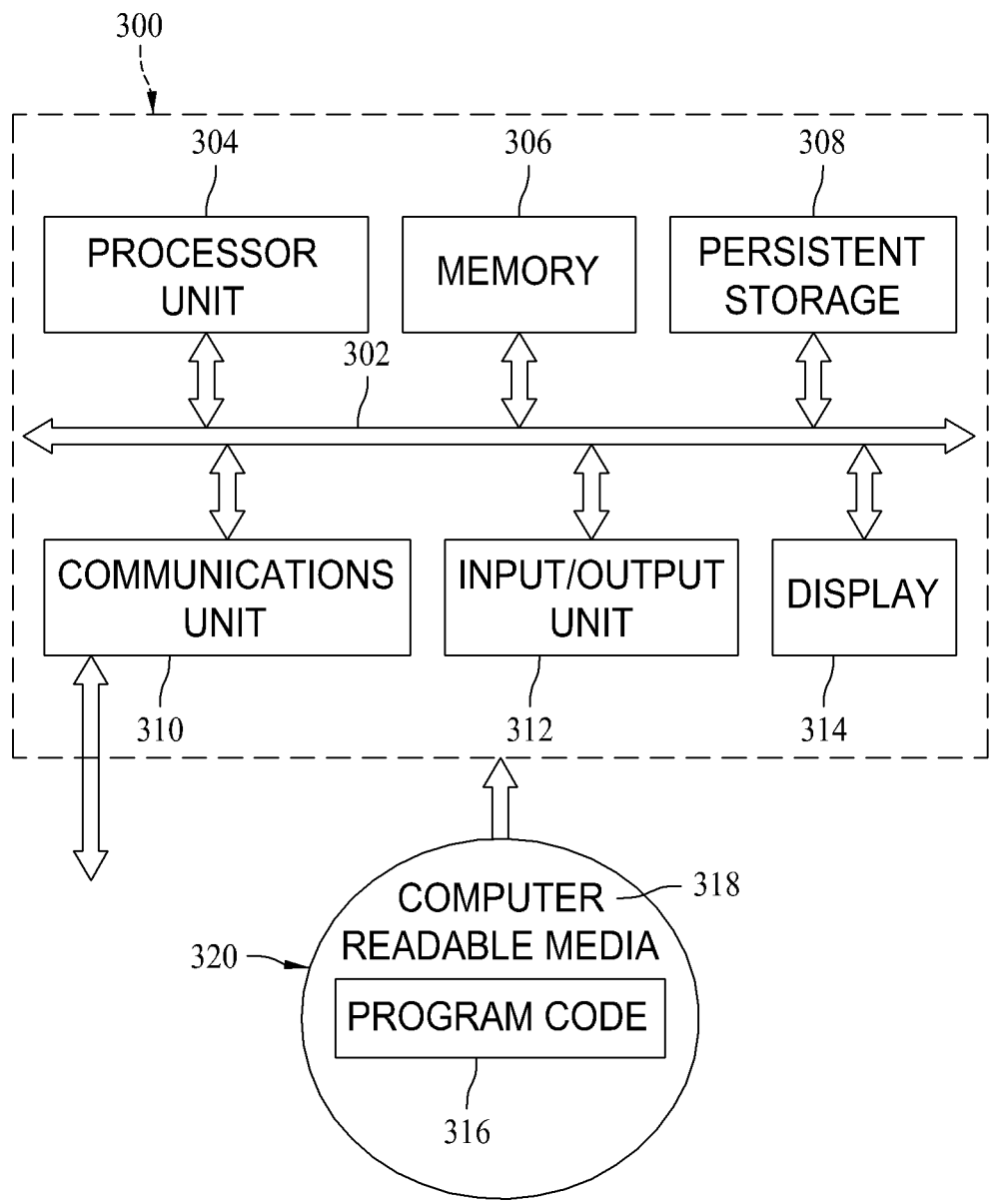
FIG. 3 is a diagram of a data processing system that might be found in the processing device of FIG. 1.

Turning now to FIG. 3, a diagram of processing system 100 is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314. Communication unit 310 is utilized for communications with peripheral devices such as sensors 130, 140, camera 150, microphone 160 and prompter 170.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

The above described embodiments are directed to methods and systems that capture data related to the motion of both internal and external human articulators using remote sensing techniques. The captured data, for example, cheek oscillations captured with a micro-powered pulse radar, is used to establish a correlation between the motion of human articulators and a captured speech signal such that spoofing and replay attacks on a security device do not succeed.

The embodiments described herein sometimes refer to "previously stored" and/or "previously captured" data such as audio data and data relating to articulator movements. Previously captured/stored data may refer to either or both of sensor data from the same session or access-attempt and/or reference data from earlier sessions or access attempts. Previously captured/stored data may be stored in memory 306, persistent storage 308, or computer readable media 318 and may include data representative of physical motion of vocal articulators for a specific speaker for correlation with data received from one or more motion sensors. The correlation of vibration data is sometimes speaker-specific. For example, a first speaker of audio may produce vibration data that produces a correlation of 80%, while other speakers may produce a correlation of 90%. Advantageous system performance is achieved when such statistical reference data is available for selecting the threshold of acceptable correlation on a per-session basis. However, using sensor data from a same session can still provide an indicator of "liveness", for example, by showing that tongue position is consistent with cheek vibrations during voiced phonemes.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for confirming that a subject is a source of spoken audio and determining the identity of the subject providing the spoken audio, said system comprising:
    at least one first motion sensor operable to capture physical movement of at least one first external articulator that contributes to the production of speech and generate physical movement data that defines the captured physical movement of the at least one first external articulator;
    at least one second motion sensor operable to capture oscillations of the at least one first external articulator and generate oscillation data;
    at least one acoustic signal sensor to receive acoustic signals and generate acoustical signal data; and
    a processing device comprising a memory and communicatively coupled to said at least one first motion sensor, said at least one second motion sensor, and said at least one acoustic signal sensor, said processing device programmed to correlate both the physical movement data of the at least one first external articulator and the oscillation data of the at least one first external articulator with the acoustical signal data to confirm that the subject is the source of the acoustical signal data for purposes of uniquely characterizing the subject and determining the identity of the subject.

2. The system according to claim 1 wherein said at least one first motion sensor comprises at least one micro-power pulse radar.

3. The system according to claim 2 wherein said at least one micro-power pulse radar is positioned and operable to capture physical movement of at least one of vocal chords, lips, tongue, cheek, jaw, mouth, teeth, and trachea of the subject.

4. The system according to claim 1 wherein said at least one second motion sensor operable to capture physical motion of at least one additional articulator that contributes to the production of speech.

5. The system according to claim 4 wherein said at least one second motion sensor comprises a micro-power pulse radar operable for capturing vibrations of at least one cheek of the subject.

6. The system according to claim 1 further comprising at least one prompter communicatively coupled to said processing device operable to solicit a specific word or phrase from the subject.

7. The system according to claim 1 wherein said memory comprises data representative of physical movement data of vocal articulators for a specific subject for correlation with data received from said at least one first motion sensor.

8. The system according to claim 1 wherein said at least one second motion sensor comprises at least one of a lateral remote articulator sensor and a frontal remote articulator sensor operable for capturing at least one of vibrations and oscillations produced during the production of speech and configured for positioning with respect to a head of the subject.

9. The system according to claim 1 wherein said processing device is programmed to model, in time, physical positions of speech articulators provided by the subject.

10. The system according to claim 1 wherein said processing device is programmed to verify that oscillations captured by said at least one second motion sensor are in temporal alignment with previously captured oscillations stored in said memory.

11. The system according to claim 1 further comprising a camera communicatively coupled to said processing device and operable, with said processing device, for accurately positioning a head of the subject with respect to said at least one first motion sensor.

12. The system according to claim 1 wherein said at least one acoustic signal sensor comprises a microphone, said microphone and said processing device operable for capturing an audible speech pattern of the subject for comparison with a speech pattern stored in said memory.

13. The system according to claim 1 wherein said at least one second motion sensor comprises at least one of a radiofrequency-induced thermoacoustic tomography device and a low-power x-ray diffraction device.

14. A method for verifying that a subject is the source of spoken audio, said method comprising:
    receiving physical vibration information, physical movement information, and acoustic speech information for the spoken audio via a plurality of sensors, the information purportedly from the subject, the physical movement information defining physical movement of an external articulator of the subject that is captured by one of the plurality of sensors, and the physical vibration information defining vibration of the external articulator;
    correlating both the physical vibration information of the external articulator and the physical movement information of the external articular with the acoustic speech information;
    analyzing the correlated information with stored physical vibration information, physical movement information, and acoustic speech information associated with the subject; and
    determining whether the correlation is within a defined threshold for verifying that the subject is the source of spoken audio and identifying the subject.

15. The method according to claim 14 wherein receiving physical vibration information, physical movement information, and acoustic speech information comprises receiving data from at least one micro-power pulse radar positioned to capture physical movement of at least one internal articulator for the subject that contributes to the production of speech.

16. The method according to claim 14 wherein receiving physical vibration information, physical movement information, and acoustic speech information comprises receiving data from at least one micro-power pulse radar positioned to capture vibrations and oscillation of at least one of vocal chords, lips, tongue, cheek, jaw, mouth, teeth, and trachea of the subject.

17. The method according to claim 14 wherein correlating the physical vibration information, the physical movement information, and the acoustic speech information comprises verifying that the received physical vibration information, physical movement information, and acoustic speech information are in temporal alignment with previously stored physical vibration information, physical movement information, and acoustic speech information associated with the subject in a memory.

18. The method according to claim 14 wherein correlating the physical vibration information, the physical movement information, and the acoustic speech information comprises comparing a speech pattern captured using a microphone with a speech pattern stored in said memory.

19. The method according to claim 14 further comprising using information captured with a camera to accurately position a head of the subject with respect to at least one motion sensor.

20. A security system comprising:
a security device;
at least one first motion sensor operable to capture physical movement data of at least one first external articulator that contributes to the production of speech and generate physical movement data that defines the captured physical movement of the at least one first external articulator;
at least one second motion sensor operable to capture oscillations of the at least one first external articulator and generate oscillation data;
at least one acoustic signal sensor to receive acoustic signals and generate acoustical signal data; and
a processing device comprising a memory and communicatively coupled to said security device, said at least one first motion sensor, said at least one second motion sensor, and said at least one acoustic signal sensor, said processing device programmed to:
correlate the physical movement data of the at least one first external articulator received from said at least one first motion sensor with previously stored physical movement data;
correlate the oscillation data of the at least one first external articulator received from said at least one second motion sensor with previously stored oscillation data; and
correlate the acoustical signal data received from said at least one acoustic signal sensor with previously stored acoustical signal data to uniquely characterize the subject for purposes of verifying the subject is the source of the acoustical signal data and verifying the identity of the subject for providing access to said security device.

* * * * *